United States Patent [19]
Hart

[11] 3,824,335

[45] July 16, 1974

[54] RECORDING TELEVISION SIGNALS

[75] Inventor: George Henry Hart, Cambridge, England

[73] Assignee: Pye Limited, Cambridge, England

[22] Filed: Apr. 17, 1972

[21] Appl. No.: 244,448

[30] Foreign Application Priority Data

Apr. 28, 1971 Great Britain .................... 11897/71

[52] U.S. Cl. .................................. 178/6.6 A, 178/6

[51] Int. Cl. ........................................... H04n 5/22

[58] Field of Search ....................... 178/6.6 R, 6.6 A

[56] References Cited

UNITED STATES PATENTS 3,271,514 9/1966 Banning .......................... 178/6.6 A 3,484,548 12/1969 Kowal ............................. 178/6.6 A 3,634,618 1/1972 Ohe ................................ 178/6.6 A

*Primary Examiner*—Terrell W. Fears

*Attorney, Agent, or Firm*—Frank R. Trifari; Henry I. Steckler

[57] ABSTRACT

For recording television signals on a video tape recorder having an input of video frequency and displaying the signals on a television receiver having an RF input, an adaptor is provided which has demodulating means for enabling incoming RF signals to be recorded on said recorder and modulating means for modulating the output of the tape recorder at a suitable carrier frequency for the RF input of the television receiver.

10 Claims, 1 Drawing Figure

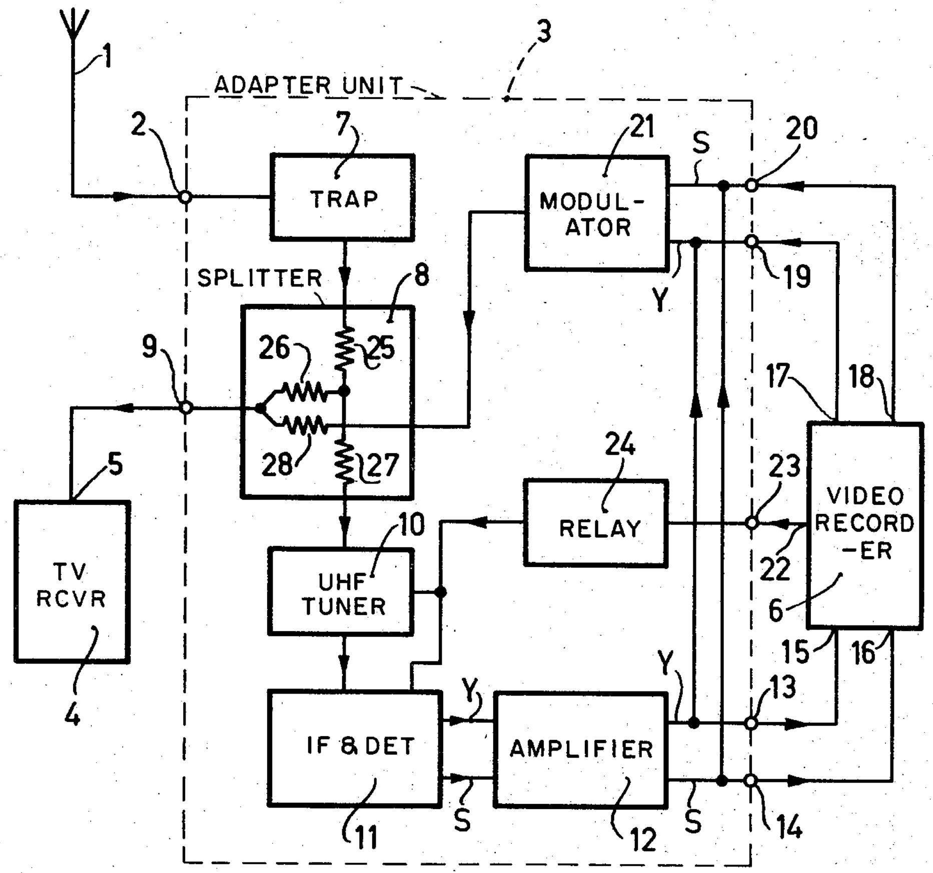
ADAPTER UNIT
TRAP
MODUL-
ATOR
SPLITTER
RELAY
TV
RCVR
UHF
TUNER
VIDEO
RECORD
-ER
IF & DET
AMPLIFIER
S
Y
1
2
3
4
5
6
7
8
9
10
11
12
13
14
15
16
17
18
19
20
21
22
23
24
25
26
27
28

RECORDING TELEVISION SIGNALS

This invention relates to apparatus for the recording and playback of television signals and particularly relates to such apparatus when used with conventional television receivers having an aerial input socket. The invention also provides an adaptor for use with such apparatus.

The difficulty with providing recording and playback facilities with existing video tape recorders is that the input to the tape recorder is at video and audio frequencies which makes it necessary to provide separate input and output facilities on a television receiver such that signals at a suitable frequency may be derived from the receiver for recording purposes and further to facilitate entry to a suitable portion of the television receiver to receive signals at video and audio frequencies from the tape recorder on playback. The provision of such additional input and output facilities incurrs additionally and unnecessary expense in the manufacture of a television receiver and also would only allow the programme signal being received by the receiver to be recorded.

It would obviously be preferable to utilise a conventional television receiver having an aerial input for UHF and/or VHF signals with a video tape recorder and it is an object of the invention to provide apparatus capable of achieving this.

The invention provides apparatus for the recording and playback of television signals which apparatus comprises a television receiver, a video tape recorder and an adaptor having a first input for connection to a source of television signals modulated on an RF carrier, a first output for connection to the aerial input socket of the television receiver, a second output for connection to the input of the video tape recorder and a second input for connection to the output of the video tape recorder, the adaptor being capable of being tuned to and demodulating an incoming signal present at the first input and for applying the signal when demodulated through said second output to the input of the tape recorder, the adaptor being additionally capable of demodulating an incoming signal present at its second input from the output of the video tape recorder on an RF carrier and of presenting the modulated signal at the first output for display on the television receiver.

In order to provide for monitoring of the signal to be or being recorded by the tape recorder, the demodulated signal may be remodulated by the modulator for display on the television receiver.

The adaptor may be prevented from being tuned to the frequency of the modulator by preventing tuning and modulation from taking place when an output from the video tape recorder is present at the second input.

The invention also provides an adaptor for use in recording and playback of television signals, which adaptor may comprise a first input terminal means adapted to be connected to a source of television signals modulated on an RF carrier, the first input terminal means being connected to a first input of an RF splitter circuit a first output of which is connected to tuning and demodulating means capable of being tuned to and demodulating a signal when present at the first input terminal means, the demodulated signal being applied to first output terminal means adapted for connection to the input of a video tape recorder, second input terminal means adapted for connection to the output of a video tape recorder, the second input terminal means being connected to a modulator and being capable of modulating the output signal of a video tape recorder on an RF carrier, the output of the modulator being applied to a second input of the RF splitter circuit, a second output of the splitter being connected to second output terminal means adapted for connection to the aerial input socket of a television receiver.

For the purpose of monitoring the demodulator output produced in the adaptor may also be applied to the input of the modulator.

The adaptor may also be provided with means for rendering the tuning and demodulating means inoperative when the video tape recorder is operating in its playback condition which may be controlled from a d.c. output of the tape recorder present when it is in its playback condition. This d.c. output when provided may control the state of a relay which disconnects a power supply to the tuning and demodulating means when the tape recorder is in its playback condition.

The above and other features of the present invention will be more readily understood by a perusal of the following description having reference to the accompanying drawing the sole FIGURE of which is a block diagram of a video tape recorder system according to the invention.

Referring to the FIGURE a source of television signals such as a UHF aerial 1 is connected to an input 2 of an adaptor unit 3. Also connected to the adaptor unit are a standard television receiver 4 having a UHF aerial input terminal 5, and a video tape recorder 6. The inputs and outputs of the video tape recorder are at video and audio frequencies.

The adaptor unit 3 includes a UHF aerial trap 7 connected between the input terminal 2 and a UHF signal splitter 8. The splitter 8 is provided with two outputs a first of which passes through an output terminal 9 of the adaptor to the aerial input socket 5 of the television receiver whilst the second output from the splitter 8 is connected to a UHF television tuner 10. The output of the tuner 10 is passed to IF amplifier and detector stages 11 to produce the vision Y and sound S outputs which are passed to vision and sound amplifier stages 12. The vision Y and sound S outputs from the amplifier stages 12 are passed respectively to output terminals 13 and 14 of the adaptor for connection to associated input terminals 15 and 16 of the video tape recorder. The vision 17 and sound 18 outputs of the video tape recorder are respectively connected to input terminals 19 and 20 of the adaptor unit which are connected to the input terminals of a modulator 21. In addition the vision and sound outputs of the amplifier stages 12 are also connected to the vision and sound inputs of the modulator 21. The output of the modulator 21 is connected to a second input of the splitter 8. A d.c. signal output from a terminal 22 on the video tape recorder is connected to an input terminal 23 of the adaptor unit and is passed to a relay 24 which relay is provided with connections for the UHF tuner 10 and the IF amplifier and detector stages 11.

The operation of the adaptor unit 3 and the manner in which it may be used with the associated equipment will now be described. UHF signals received at the aerial 1 are passed through the terminal 2 of the adaptor unit 3 and thence through the trap 7 to the splitter 8.

The splitter causes the incoming signals to be present at the output terminal 9 for the television receiver 4 and at the input of the UHF tuner 10. Thus the UHF signals received by the aerial 1 are present at the input 5 of the television receiver 4 which receiver may be normally tuned to receive any desired incoming signal. The tuner unit 10 may also be tuned to receive an incoming signal from the aerial 1, which signal may be different to that being received by the television receiver. The IF output signal from the tuner 10 is amplified and detected in the stages 11 to provide vision Y and sound S outputs which are amplified by the amplifier stages 12, the amplified vision and sound signals being applied to the output terminal 13 and 14 and which may be recorded by the video tape recorder 6. At the same time the output signals from the amplifier stages 12 are also applied to the modulator 21 which modulates its incoming signals on a chosen channel frequency within the UHF television bands, the frequency of the channel being chosen so that it does not interfere with normally received television signals at the aerial 1. The modulated output from the modulator 21 is applied to the splitter 8 and thus this modulated signal is available at the terminal 9 and may be monitored by the television receiver 4, the receiver then being tuned to this modulated signal. Thus the signal to be recorded by the video tape recorder 6 may be monitored which will give an indication of tuning to the UHF tuner 10. When the operator is satisfied with the tuning of the tuner unit 10 he may if he so wishes select a different television signal at the receiver 4 and view this whilst recording of the desired signal is taking place. For playback purposes the vision and sound outputs from the video tape recorder are passed respectively to input terminals 19 and 20 of the adaptor unit 3 for modulation by the modulator 21 in the manner before described, the modulated signal being viewed as before on the television receiver 4 which is now tuned to the modulator channel frequency. In order to prevent the recorded signals from passing to the outputs of the sound and vision amplifier 12 and thus forming a closed loop in the adaptor unit if the tuner so happens to be tuned to the modulator frequency, a d.c. output provided by the video tape recorder when it is in the playback condition is applied to a relay 24 which relay then disconnects the tuner unit 10 and IF amplifier and detector stages 11 from their power supplies so rendering these stages inoperative during playback.

In order to prevent radiation of the modulated UHF signal provided by the modulator 21 the trap 7 included between the input 2 of the splitter 8 is tuned to the modulator frequency to prevent such radiation.

Although the adaptor has been described to be used with an aerial 1 the input to terminal 2 may alternatively be from a television camera which has a suitable RF output. For use with television cameras in which the output is at video frequency the input to the adaptor unit 3 for such a camera could either be at the input to the vision amplifier and stage 12 or to its output depending on the level of the video output from the camera.

In the above description reference is made to the signals being of video or audio frequency and thus suitable for monochrome television receivers. It will of course be realised that in the case where the signal for recording and playback is a colour television signal the video signal would be replaced by a luminance signal and additional stages and connections will be required to demodulate the colour information and pass it to and from the video tape recorder.

What we claim is:

1. An adaptor for use in the recording and playback of television signals, said adaptor comprising a first input terminal means for receiving television signals modulated on an RF carrier, means for permitting simultaneous recording and viewing of different signals in the same television band comprising an RF splitter, said first input terminal means being connected to a first input of said RF splitter circuit a first output of which is connected to tuning and demodulating means capable of being tuned to and providing a demodulated signal when present at said first input terminal means, said demodulated signal being applied to first output terminal means for supplying the input of a video tape recorder, second input terminal means for receiving an output signal of a video tape recorder, said second input terminal means being connected to a modulator and being capable of modulating the output of said modulator being applied to a second input of said RF splitter circuit, a second output of said splitter being connected to second output terminal means for supplying the aerial input socket of a television receiver.

2. An adaptor as claimed in claim 1 in which said demodulated signal is additionally applied to the input of said modulator.

3. An adaptor as claimed in claim 1 in which means is provided for rendering said tuning and demodulating means inoperative when said video tape recorder is operating in its playback condition.

4. An adaptor as claimed in claim 3 in which said means for rendering said tuning and demodulating means inoperative comprises input means for receiving a d.c. output of said tape recorder when said recorder is in its playback condition.

5. An adaptor as claimed in claim 4 in which the rendering means comprises a power supply connected to said tuning and demodulating means and a relay means coupled to said rendering means input means for disconnecting said power supply from said tuning and demodulating means when said tape recorder is in its playback condition.

6. An adaptor as claimed in claim 1, in which an RF trap is provided between said first input terminal and the first input of said RF splitter circuit which trap is tuned to the RF frequency of said modulator.

7. A circuit for coupling a video recorder to a telvision receiver, said circuit comprising means for permitting simultaneous recording and viewing of different signals in the same television band comprising a power splitter having a first input means for receiving a carrier modulated video signal, a second input, a first output, and a second output means for supplying a signal to said receiver; a tuning and demodulating means having an input coupled to said first splitter output, and an output means for supplying a signal to said recorder; and a modulator having a selected frequency and an input means for receiving a signal from said recorder, and an output coupled to said splitter second input.

8. A circuit as claimed in claim 7 wherein said modulator input is coupled to said tuning and demodulating means output.

9. A circuit as claimed in claim 7 further comprising a trap tuned to the modulator frequency and having an input coupled to receive said carrier modulated signal, and an output coupled to said splitter first input.

10. A circuit as claimed in claim 7 further comprising means having an input adapted to be coupled to said recorder and an output coupled to said tuning and demodulating means for disabling said tuning and demodulating means upon playback of said recorder.

* * * * *